(12) United States Patent
Duvdevany et al.

(10) Patent No.: US 10,642,025 B2
(45) Date of Patent: May 5, 2020

(54) METHOD FOR CONTROLLING POSITION OF A LINEAR MEMS MIRROR WITH VARIABLE RESOLUTION AND/OR LIGHT INTENSITY

(71) Applicant: STMicroelectronics Ltd, Netanya (IL)

(72) Inventors: Offir Duvdevany, Tel Aviv (IL); Dadi Sharon, Givat Ada (IL); Sason Sourani, Hod Hasharon (IL)

(73) Assignee: STMICROELECTRONICS LTD., Netanya (IL)

( * ) Notice: Subject to any disclaimer, the term of this patent is extended or adjusted under 35 U.S.C. 154(b) by 514 days.

(21) Appl. No.: 15/280,691

(22) Filed: Sep. 29, 2016

(65) Prior Publication Data

US 2017/0285327 A1 Oct. 5, 2017

(30) Foreign Application Priority Data

Mar. 30, 2016 (IT) .......................... 102016000032650

(51) Int. Cl.
*G02B 26/08* (2006.01)
*G02B 26/10* (2006.01)
(Continued)

(52) U.S. Cl.
CPC ....... *G02B 26/0833* (2013.01); *G02B 7/1821* (2013.01); *G02B 26/0841* (2013.01); *G02B 26/105* (2013.01); *G03B 21/008* (2013.01)

(58) Field of Classification Search
CPC ................ G02B 26/105; G02B 26/101; G02B 26/0841; G02B 26/0858; G02B 26/085;
(Continued)

(56) References Cited

U.S. PATENT DOCUMENTS

2003/0072060 A1* 4/2003 Sourani ................. H04B 10/60
398/121
2004/0228631 A1* 11/2004 Mantin ............... H04J 14/0204
398/83
(Continued)

FOREIGN PATENT DOCUMENTS

RU       2377509 C1 * 12/2009
WO     03/036553 A1     5/2003
WO   WO-03036553 A1 *  5/2003 ........... G02B 26/101

OTHER PUBLICATIONS

Geng, "Structured-light 3D surface imaging: a tutorial," *Advances in Optics and Photonics* 3(2):128-160, 2011.
(Continued)

*Primary Examiner* — Bumsuk Won
*Assistant Examiner* — Tamara Y. Washington
(74) *Attorney, Agent, or Firm* — Seed Intellectual Property Law Group LLP

(57) ABSTRACT

The method for controlling an angular position of a MEMS mirror, includes: applying a first driving moment to the MEMS mirror to generate a rotational scanning movement of the mirror; and, at a zooming instant, applying a second driving moment to the MEMS mirror, wherein the second driving moment is equal to the first driving moment plus an extra moment. The extra moment may be a DC offset. After a transient period of time from zooming instant, a third driving moment $M_2 = k\dot{\theta}_2 t$ is applied. The first and third driving moment are variable linearly with time. The driving moments are applied to torsional springs of the mirror.

19 Claims, 3 Drawing Sheets

(51) Int. Cl.
*G02B 26/12* (2006.01)
*G02B 7/182* (2006.01)
*G03B 21/00* (2006.01)

(58) Field of Classification Search
CPC ... G02B 26/0833; G02B 26/10; G02B 26/127
USPC .......................................... 359/196.1–226.3
See application file for complete search history.

(56) References Cited

U.S. PATENT DOCUMENTS

2005/0219677 A1   10/2005   Krylov et al.
2006/0274398 A1*  12/2006   Chou .................... B81B 3/0035
                                                359/247
2009/0244668 A1*  10/2009   Fujino ................ G02B 26/0841
                                                359/200.6

OTHER PUBLICATIONS

Hah et al., "A Low Voltage, Large Scan Angle MEMS Micromirror Array with Hidden Vertical Comb-Drive Actuators for WDM Routers," *Optical Fiber Communication Conference and Exhibit*, Anaheim, California, USA, Mar. 17-22, 2002, pp. 92-93.

Hofmann et al., "High-Q MEMS Resonators for Laser Beam Scanning Displays," *Micromachines* 3(2):509-528, 2012.

Meral et al., "Design Methodology for Microelectromechanical Systems. Case Study: Torsional Scanner Mirror," *Journal of Mechanical Design* 129(10):1023-1030, 2007. (9 pages).

\* cited by examiner

METHOD FOR CONTROLLING POSITION OF A LINEAR MEMS MIRROR WITH VARIABLE RESOLUTION AND/OR LIGHT INTENSITY

BACKGROUND

Technical Field

The present disclosure relates to a MEMS device including a linear mirror with variable resolution and/or light intensity.

Description of the Related Art

As is known, MEMS devices are increasingly used in a variety of applications, by virtue of their reduced dimensions and low costs. For example, so-called MEMS micro-mirrors are used, i.a., in imaging applications. Pico-projectors have been disclosed including a MEMS micro-mirror configured to receive an optical beam and to vary the direction thereof. Typically, the direction of propagation of the optical beam is varied in a periodic or quasi-periodic way so as to carry out a scan of a portion of space with the reflected optical beam.

Actuation of the MEMS micro-mirrors may be controlled in a linear or in a resonant way. Linear MEMS mirrors (or V-MEMS mirrors), unlike resonance MEMS mirrors, can operate at frequencies far below the natural resonance frequency of the mirror and even at DC. Driving technology for linear MEMS mirrors may be of electrostatic, magnetic, thermal or piezoelectric type.

Linear MEMS mirrors may be of a single axis (1D) type or of a dual axis (2D) type. In the latter case (dual axis MEMS mirrors), actuation around the two axes may be of a same linear or resonant type or may be of different type (resonant actuation for a first, fast scan axis, generally an horizontal axis, and quasi-static linear actuation for a second, slow scanning axis, generally a vertical axis.

For example, FIG. 1 shows an example of an 3-D imaging system for gesture recognition using structured light 3-D detection and including a pico-projector 1 and a micro-camera 2.

The pico-projector 1 accommodates a MEMS mirror so as to emit a light beam M scanning a 3D object 3, here represented schematically, along two scanning directions, e.g. angles Θ and α. The pico-projector 1 and the camera 2 are not in line with the object 3 so that perspective shift (parallax) is occurred. The light beam may be visible, invisible or in any useful frequency range.

For example, the pico-projector 1 projects parallel strips 4 that are detected by the camera 2. The "deformation" of the detected light beam from straight lines is processed for detecting the third dimension information (the missing depth).

Other imaging systems may include a pico-projector integrated in electronic devices, in particular portable or mobile devices, for optical operations, for example for directing light radiation beams generated by a light source, e.g. a laser, according to desired scanning patterns.

In general, a MEMS-based pico-projector for imaging systems may have the structure shown in FIG. 2. The pico-projector 10 of FIG. 2 comprises a light source 6, typically a laser beam source, generating a light beam 7 formed of three monochromatic beams, each of a respective base colour. The light beam 7 passes an optical element 8 shown only schematically and is deflected by a micro-mirror 5. The micro-mirror 5 may be a single, two-dimensional element, or two, one-dimensional elements. In FIG. 2, the micro-mirror 5 is of two-dimensional type, controlled so as to rotate around a vertical axis A and a horizontal axis B. The rotation of the micro-mirror 5 around the vertical axis A generates a horizontal fast scan, and the rotation of the micro-mirror 5 around the horizontal axis B generates a vertical slow scan, as shown in FIG. 3. In FIG. 2, after reflection, the light beam 7 is deflected toward a screen 9.

An exemplary and non-limiting implementation of the micro-mirror 5 is shown in FIG. 4. Here the micro-mirror 5 has a purely electrostatic actuation and is made in a chip 17 forming a platform 11. The platform 11 has a reflecting surface (not shown) and is supported by a suspended frame 13 through a first pair of arms 12 (first torsional springs). The first arms 12 extend from opposite sides of the platform 11 and allow twisting of the platform 11 around first rotation axis A. The suspended frame 13 is coupled to a fixed peripheral portion 15 of the chip 17 through a second pair of arms 16 (second torsional springs) that allow twisting of the suspended frame 13, and thus of the platform 11, around second rotation axis B.

In FIG. 4, the first and second arms 12, 16 are coupled to respective actuation groups 18A, 18B of an electrostatic type. Each actuation group 18A, 18B here comprises first electrodes 19 facing respective second electrodes 20. By applying a voltage drop between the first electrodes 19 and the second electrodes 20, attraction/repulsion forces are generated between them, causing a torque (moment) on the springs and rotation of the arms 12, 16 around their respective axes A, B. Thereby, scanning around the horizontal and vertical directions may be controlled.

In some applications, a variation in the resolution and/or light intensity, e.g. an increase, may be desired. In the following, such a variation will also be called "zooming-in" and "zooming-out". For example, in the pico-projector 1 of FIG. 1, "zooming-in" means increasing the amount of light in some areas of the object 3, also indicated as "areas of interest", where greater detail is desired.

The differential equation that governs rotation of a micro-mirror when a moment M is applied to torsional springs (such as springs 12, 16 for micro-mirror 5 of FIG. 4) is well known. Hereinbelow, a single scanning direction (e.g. the direction of the strips 4 in FIG. 1 or the horizontal direction in FIG. 3) is considered and θ is the scanning angle (or angular position of the mirror). However, the following discussion may be easily extended to a two-dimensional control.

In particular, ignoring losses due to air drag that are usually very low, the differential equation tying the moment M(t) to the scanning angle θ is the linear equation [1] below:

$$k\theta + j\ddot{\theta} = M(t) \quad [1]$$

where:
k is the spring stiffness
j is the mirror moment of inertia
$\ddot{\theta}$ is the second derivative in time of the mirror angle.

One solution to equation [1] above is full linear scan of the "area of interest". According to this known solution, scanning is uniform in all sections of the scanned area.

This solution has the drawback that refresh is slow due to the full scan. In addition, maximum resolution may be insufficient for some portions of the scanned area.

BRIEF SUMMARY

At least one embodiment of the disclosure is a MEMS device not affected by the above drawbacks. In particular, the MEMS device allows modification of the resolution and/or light intensity in a simple, purely electronic way.

According to the present disclosure, there is provided a method for controlling an angular position of a MEMS mirror. The method includes applying a first driving moment to the MEMS mirror to generate a rotational scanning movement of the mirror; and performing a zooming by applying a second driving moment to the MEMS mirror. The second driving moment is equal to the first driving moment plus an extra moment.

According to the present disclosure, there is provided a MEMS device that includes a MEMS mirror and a processing unit. The processing unit has a speed controller configured to apply a first driving moment to the MEMS mirror to generate a rotational scanning movement thereof; and apply a second driving moment to the MEMS mirror at a zooming instant. The second driving moment is equal to the first driving moment plus an extra moment.

BRIEF DESCRIPTION OF THE SEVERAL VIEWS OF THE DRAWINGS

For the understanding of the present disclosure, preferred embodiments are now described, purely as a non-limitative example, with reference to the attached drawings, wherein:

FIG. 5 illustrates an ideal plot of the scanning angle during zooming in;

FIG. 6 illustrates a undesired plot of the scanning angle during zooming in;

DETAILED DESCRIPTION

The present description refers to a MEMS mirror which is controlled in a linear way, operating a far lower frequency than the natural resonance frequency of the MEMS structure (e.g., one tenth). For example, if the natural resonance frequency is about 700 Hz, the MEMS mirror may be driven at about 60 Hz.

The present MEMS mirror is controlled so as to have different scanning speeds in different scanning areas, wherein the expression "scanning speed" means a first derivative of the angular position or scanning angle of the MEMS mirror. For example, in case an apparatus including the MEMS mirror is intended to control the power of front head lights in the automotive field, it may change light intensity in different projection areas. In fact, controlling the movement of the MEMS mirror to have closer scanning lines allows a more powerful lighting; whereas the higher the velocity of the MEMS mirror, the lower the obtainable power. Or, in case the device is a pico-projector for image processing, controlling the scanning speed may allow an increased resolution in an "area of interest" comprised in a broader scanning area. This may be obtained by slowing the scanning speed in this area, thus trading speed and resolution in the different areas based on the needs.

Figure 5:
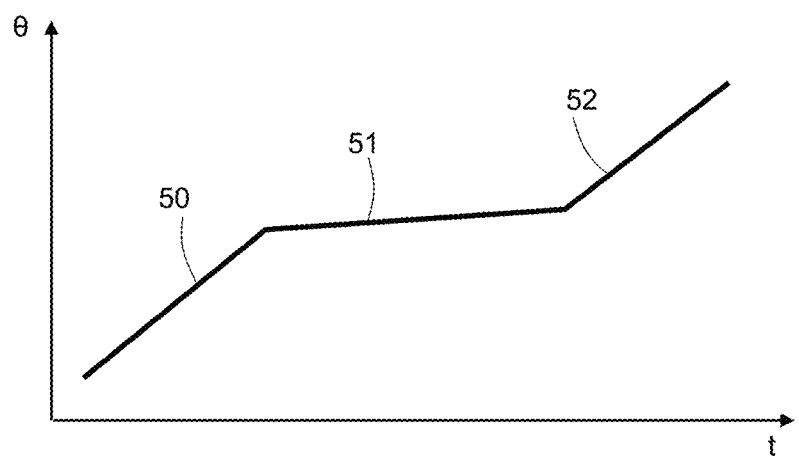

FIG. 5 shows an exemplary control of the scanning angle θ of a MEMS mirror using the above solution.

Here, the plot of the scanning angle θ versus time has three straight portions: a first portion 50 with higher slope, a second portion 51 with lower slope, and a third portion 52 with again higher slope (e.g., the same as in the first portion 50), corresponding for example (in an imaging application) to a lower resolution in the area scanned in first portion 50, higher resolution in the area scanned in second portion 51 and again lower resolution in the area scanned in third portion 52.

While operating in a linear scanning mode, however, it is difficult to immediately switch from the higher slope in the first portion 50 to the lower slope of second portion 51 without activating a resonance frequency of the mirror. In fact, if the change of slope is made in zero time, the result shown in FIG. 6 would be obtained.

Figure 6:
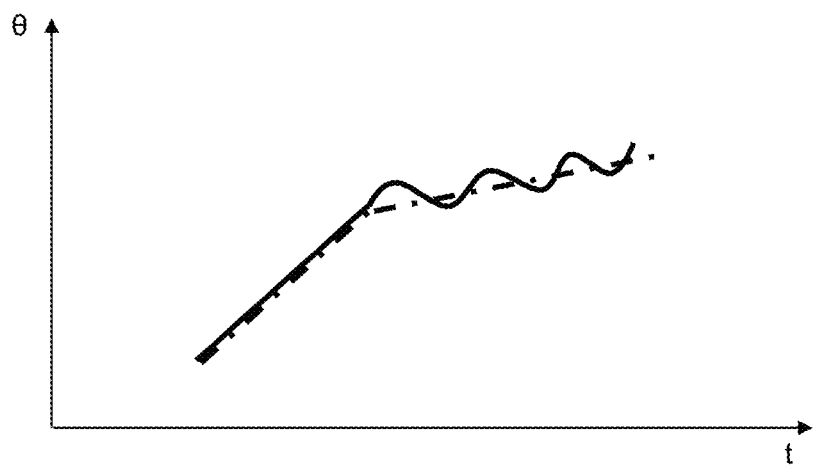

According to an embodiment, to avoid the resonant behavior of FIG. 6, the scanning speed is modified by introducing a DC (i.e., fixed) offset in the driving.

Hereinbelow, we will demonstrate that, by applying an offset moment to the MEMS mirror, the latter, after a transient, is able to reach a stable condition and to rotate at different constant speed (thus the scanning angle θ moves on another straight line with different slope.

To this end, consider the complete second order equation governing the motion of a linear mirror:

$$k\theta + 2\zeta\sqrt{jk}\dot{\theta} + j\ddot{\theta} = M \quad [2]$$

wherein:

θ is the mirror angle (which is a function of time t);
k is the spring stiffness constant;
ζ is the damping ratio, as explained below;
j is the inertial angular mass of the mirror; and
M is the applied moment (also a function of time t).

In equation [2] the left side describes the mirror behavior and the right side describes the exciting or driving moment.

The central part of the left side of equation [2], $2\zeta\sqrt{jk}\dot{\theta}$, are the losses. The losses are usually very small compared to the other two parts of the left side of equation [2] and in most cases can be neglected. This term however explains why, applying a constant moment, after a long period of time the excited mirror subsides to a constant value.

In fact, from equation [2] we have that, when a constant moment is applied ($\dot{\theta}=\ddot{\theta}=0$), after a transition time, the position of the mirror becomes:

$$k\theta_c = M_c \quad [3]$$
$$\theta_c = \frac{M_c}{k}$$

wherein $M_c$ is the applied constant moment and $\theta_c$ is the (final) angle reached by the MEMS mirror.

Therefore, when an offset moment $M_c$ is introduced, the angle, after a transition time, will be $\theta_c$.

Subtracting equations [2] and [3] we get:

$$k(\theta - \theta_c) + 2\zeta\sqrt{jk}\dot{\theta} + j\ddot{\theta} = (M - M_c)$$

Since $\theta_c$ is constant, $$d(\theta - \theta_c)/dt = \dot{\theta} \text{ and}$$

$$d^2(\theta - \theta_c)/dt^2 = \ddot{\theta},$$

thus:

$$k(\theta - \theta_c) + 2\zeta\sqrt{jk}\frac{d(\theta - \theta_c)}{dt} + \frac{jd^2(\theta - \theta_c)}{dt^2} = (M - M_c) \quad [4]$$

Equation [4] demonstrate that, by applying an offset to a MEMS mirror, it is possible to obtain a corresponding angular position and a corresponding moment that ensure exactly the same behavior as before application of the offset moment (instant t=0).

Hereinbelow, we will calculate the moment which is to be applied to the MEMS mirror in order to pass from a straight portion to a following portion at a different second slope.

Figure 7:
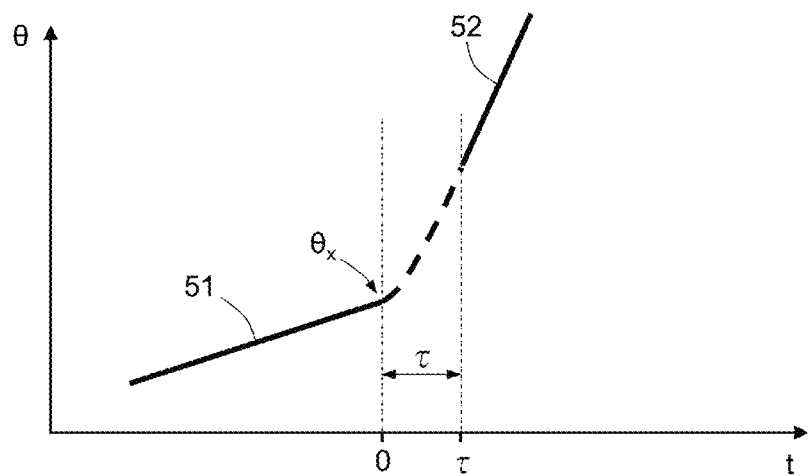
FIG. 7 shows an enlarged portion of a desired scanning angle plot during variation of the scanning speed.

To this end, let's assume that the scanning angle θ of MEMS mirror is along second portion 51 of the curve of FIG. 5 and shall pass to third portion 52 of the same curve (see also FIG. 7, "zooming out" condition).

Let's consider again equation [1]:

$$k\theta + j\ddot{\theta} = M(t) \quad [1]$$

Since second portion 51 is straight, the corresponding scanning speed is constant, e.g. equal to $\dot{\theta}_1$.

In addition, the angular position is $\theta = t\dot{\theta}_1$ and the acceleration is $\ddot{\theta} = 0$.

Equation (1) thus becomes:

$$k\dot{\theta}_1 t = M_1 \quad [5]$$

Therefore, a linear moment, $M_1$ with slope equal to $k\dot{\theta}_1$, ensures the rotation of a MEMS mirror according to a straight line.

At time instant (zooming instant) t=0, we wish to pass from second portion 51 at (constant) angular speed $\dot{\theta}_1$ to third portion 52 at a different (constant) angular speed $\dot{\theta}_2$.

For analogy to equation (5), we have:

$$M_2 = k\dot{\theta}_2 t$$

Let us assume that switching between second portion 51 and third portion 52 of the curve of FIG. 7 occurs at angular position $\theta_x$, furthermore, we impose that switching occurs at a constant acceleration (deceleration) value $\ddot{\theta}_0$, until reaching speed $\dot{\theta}_2$.

By integrating constant acceleration value $\ddot{\theta}_0$, we have:

$$\dot{\theta}(t) = \ddot{\theta}_0 t + C1$$

Here, at instant t=0, we have $\dot{\theta}(0) = \dot{\theta}_1$, thus we obtain:

$$\dot{\theta}(t) = \ddot{\theta}_0 t + \dot{\theta}_1 \quad [6]$$

By integrating equation [6] as a function of t, we get the mirror angle:

$$\theta(t) = \int \dot{\theta}(t)dt + C2 = \int (\ddot{\theta}_0 t + \dot{\theta}_1)dt + C2$$

$$\theta(t) = \ddot{\theta}_0 \frac{t^2}{2} + \dot{\theta}_1 t + C2$$

At instant t=0, as indicated, the angular position of the MEMS mirror is $\theta_x$, thus $C2 = \theta(0) = \theta_x$.

The equation that governs the switching of the mirror movement from the second portion 51 to the third portion 52 is thus:

$$\theta(t) = \ddot{\theta}_0 \frac{t^2}{2} + \dot{\theta}_1 t + \theta_x. \quad [7]$$

By replacing equation [7] in the differential equation [1], we obtain:

$$k\left[\ddot{\theta}_0 \frac{t^2}{2} + \dot{\theta}_1 t + \theta_x\right] + j\frac{d^2}{dt^2}\left[\ddot{\theta}_0 \frac{t^2}{2} + \dot{\theta}_1 t + \theta_x\right] = M$$

$$k\left[\ddot{\theta}_0 \frac{t^2}{2} + \dot{\theta}_1 t + \theta_x\right] + j\ddot{\theta}_0 = M$$

$$\ddot{\theta}_0\left[k\frac{t^2}{2} + j\right] + k\dot{\theta}_1 t + k\theta_x = M$$

Since, according to equation [5], $k\dot{\theta}_1 t = M_1$, we have:

$$\ddot{\theta}_0\left[k\frac{t^2}{2} + j\right] + M_1 + k\theta_x = M$$

$$M - M_1 = \ddot{\theta}_0\left[k\frac{t^2}{2} + j\right] + k\theta_x$$

Thus, $M - M_1 \triangleq M_0$ is an extra moment to be added at instant t=0 to pass to third portion 52 of the curve of FIG. 7 with constant acceleration:

$$M_0(t) = \ddot{\theta}_0\left[k\frac{t^2}{2} + j\right] + k\theta_x \quad [8]$$

In equation [8], the right side is known. The length of time (acceleration time t) requested to accelerate from constant speed of $\dot{\theta}_1$ to the new constant speed of $\dot{\theta}_2$ is:

$$t = \frac{\dot{\theta}_2 - \dot{\theta}_1}{\ddot{\theta}_0} \quad [9]$$

After the acceleration time t, analogously to equation [5], the moment is:

$$M_2 = k\dot{\theta}_2 t$$

Of course, the extra moment to be added may be a negative one, so as to obtain switching from a higher slope to a lower slope, such as from first portion 50 to second portion 51 of FIG. 5.

Figure 1:
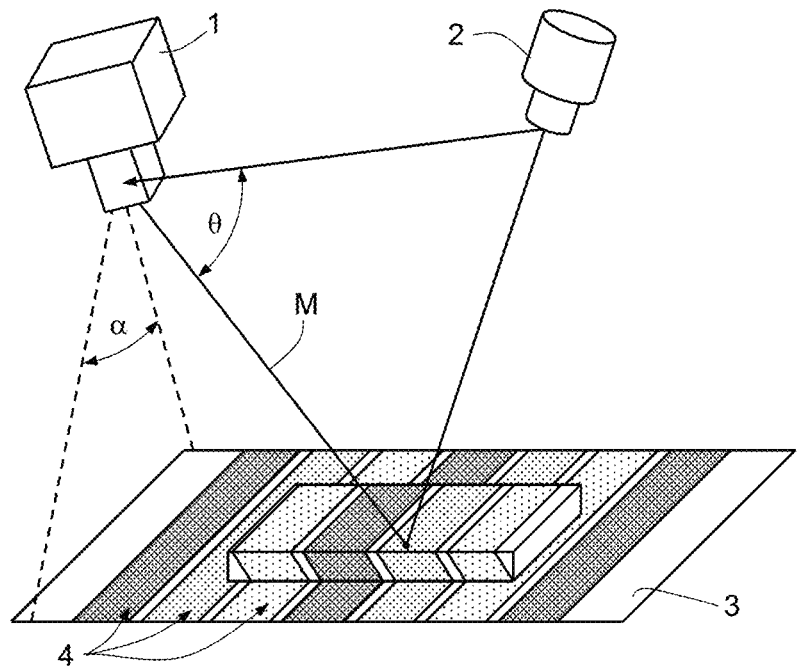
FIG. 1 is a schematic representation of a 3-D imaging system for gesture recognition using structured light 3-D detection.
Figure 2:
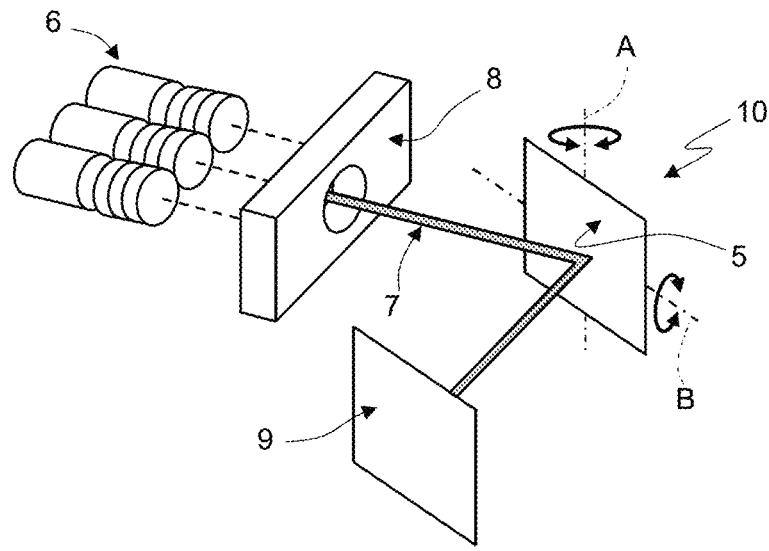
FIG. 2 is a schematic representation of a pico-projector for image scanning.
Figure 3:
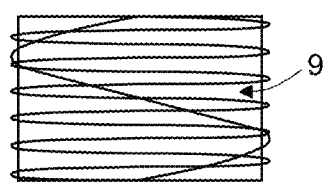
FIG. 3 shows the projection plot of an image generated by pico-projector on a screen.
Figure 4:
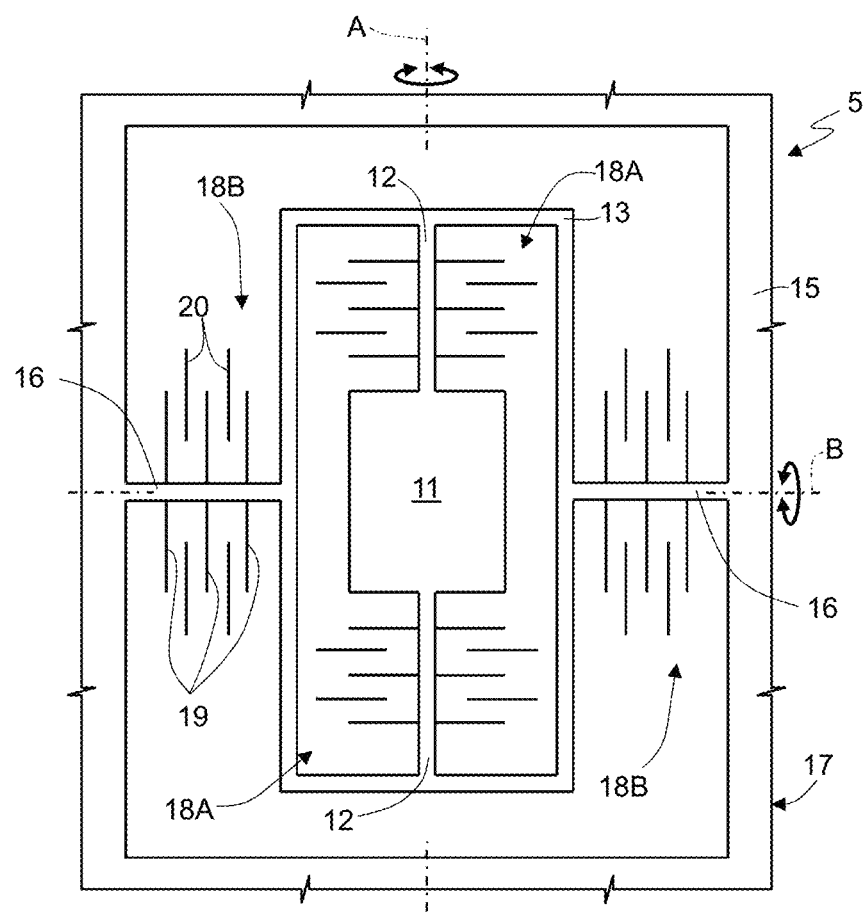
FIG. 4 is a top plan view of a MEMS micro-mirror with electrostatic actuation.

The conversion from the applied moment M and the controlling quantity (e.g. a voltage drop V for the micromirror 5 of FIG. 4, a current in an electromagnetic case or temperature in other actuation systems) is thus non-linear and may depend on the scanning angle θ.

Figure 8:
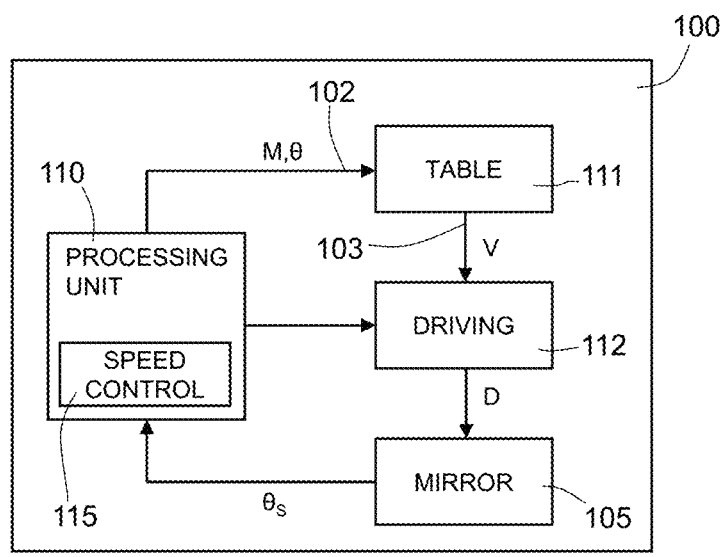
FIG. 8 show a schematic diagram of an electric apparatus using the present method.

In an embodiment, a non-linear conversion table is used to convert the driving moment M to the quantity used to control the position of the MEMS mirror. For example, FIG. 8 schematically shows an electric apparatus 100 comprising a MEMS mirror 105. Electric apparatus 100 may be, for example, a 3D detection system for gesture recognition. Electric apparatus 100 may also be a portable computer, a laptop, a notebook, a PDA, a tablet, and a smartphone, for optical operations, in particular for directing light radiation beams generated by a light source in desired patterns. In the alternative, electric apparatus 100 may be a lighting apparatus, e.g. for automotive applications. Mirror 105 may be formed as mirror 5 of FIG. 4.

The electric apparatus 100 has a processing unit 110, a table 111 and a driving unit 112. The processing unit 110 include speed control means 115 that calculates the instant moment M according to the above method according to the desired scanning speed. The table 111 and the driving unit 112 are coupled to the processing unit 110. The table 111 has an input 102 and an output 103. The input 102 of table 111 receives the values of the instant moment M and the current angle θ from processing unit 110. The corresponding control voltage value V is read on the table and fed to the driving unit 112 on the output 103. The driving unit 112 generates corresponding driving signals D for the mirror 105, whose actual position $\theta_S$ is fed back to the processing unit 110.

In another embodiment, table 111 is used only to store the steady stable position value $\theta_x$ (position at equilibrium, when $\dot{\theta}=\ddot{\theta}=0$). In this case, table 111 is considerably simplified.

The advantages of the present disclosure are clear from the above. In particular, it is underlined that the present solution allows obtaining a purely electronic "zoom-in" or "zoom-out" without using any special optics.

No different light sources are needed, but a same light source can achieve more or less brightness on a projected or scanned area.

No mechanical engine is needed to move a projected pattern to different directions.

Finally, it is clear that numerous variations and modifications may be made to the described and illustrated method and device, all falling within the scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an angular position of a MEMS mirror, comprising:
    applying a first driving moment to the MEMS mirror, applying the first driving moment generating a rotational scanning movement of the mirror; and
    performing a zooming, which modifies at least one of a resolution and a light intensity of the MEMS mirror, by applying a second driving moment to the MEMS mirror, wherein the second driving moment is equal to the first driving moment plus an extra driving moment, wherein the extra driving moment is a fixed moment.

2. The method according to claim 1, wherein the first driving moment is variable linearly with time.

3. The method according to claim 2, wherein the first and second driving moments are applied to torsional springs of the mirror and the first driving moment is given by the equation:

$$k\dot{\theta}_1 t = M_1$$

wherein k is a stiffness constant of the springs, θ is a first derivative of an angular position of the mirror, and t is time.

4. The method according to claim 1, wherein the first and second driving moments are applied to torsional springs of the mirror and the extra driving moment (M-M$_1$) is equal to:

$$M - M_1 = \ddot{\theta}_0 \left[ k\frac{t^2}{2} + j \right] + k\theta_x$$

wherein k is a stiffness constant of the springs, $\ddot{\theta}_0$ is a second derivative of an angular position of the mirror at a zooming instant, j is an inertial angular mass of the mirror, t is time, and $\theta_x$ is the angular position of the mirror at the zooming instant.

5. The method according to claim 1, comprising applying a third driving moment $M_2 = k\dot{\theta}_2 t$ after a transient period of time t from a zooming instant, wherein k is a stiffness constant of the springs, and $\dot{\theta}_2$ is a speed of the mirror.

6. The method according to claim 5, wherein applying the first driving moment comprises rotating the MEMS mirror at a first constant speed $\dot{\theta}_1$ and applying the third driving moment comprises rotating the MEMS mirror at the speed $\dot{\theta}_2$, which is constant.

7. The method according to claim 1, comprising:
    reading from a conversion table a control electrical quantity corresponding to an instant driving moment; and
    controlling rotation of the MEMS mirror according to the control electrical quantity read from the conversion table.

8. A method, comprising:
    controlling an angular position of a MEMS mirror, the controlling including:
        applying a first driving moment to the MEMS mirror, applying the first driving moment generating a rotational scanning movement of the mirror; and
        modifying at least one of a resolution and a light intensity of the MEMS mirror by applying a second driving moment to the MEMS mirror, wherein the second driving moment is equal to the first driving moment plus a fixed moment.

9. The method according to claim 8, wherein the first driving moment is variable linearly with time.

10. The method according to claim 8, wherein the first and second driving moments are applied to torsional springs of the mirror and the first driving moment is given by the equation:

$$k\dot{\theta}_1 t = M_1$$

wherein k is a stiffness constant of the springs, $\dot{\theta}_1$ is a first derivative of an angular position of the mirror, and t is time.

11. The method according to claim 8, wherein the first and second driving moments are applied to torsional springs of the mirror and the extra driving moment (M-M$_1$) is equal to:

$$M - M_1 = \ddot{\theta}_0 \left[ k\frac{t^2}{2} + j \right] + k\theta_x$$

wherein k is a stiffness constant of the springs, $\ddot{\theta}_0$ is a second derivative of an angular position of the mirror at a zooming instant, j is an inertial angular mass of the mirror, t is time, and $\theta_x$ is the angular position of the mirror at the zooming instant.

12. The method according to claim 8, comprising applying a third driving moment $M_2 = k\dot{\theta}_2 t$ after a transient period of time t from a zooming instant, wherein k is a stiffness constant of the springs, and $\dot{\theta}_2$ is a speed of the mirror.

13. The method according to claim 12, wherein applying the first driving moment comprises rotating the MEMS mirror at a first constant speed $\dot{\theta}_1$ and applying the third driving moment comprises rotating the MEMS mirror at the speed $\dot{\theta}_2$, which is constant.

14. The method according to claim 8, comprising:
reading from a conversion table a control electrical quantity corresponding to an instant driving moment; and
controlling rotation of the MEMS mirror according to the control electrical quantity read from the conversion table.

15. A method, comprising:
controlling an angular position of a MEMS mirror, the controlling including:
applying a first driving moment to the MEMS mirror, applying the first driving moment generating a rotational scanning movement of the mirror;
performing a zooming at a zooming instant by applying a second driving moment to the MEMS mirror, wherein the second driving moment is equal to the first driving moment plus an extra driving moment; and
applying a third driving moment $M_2 = k\dot{\theta}_2 t$ after a transient period of time t from the zooming instant, wherein k is a stiffness constant of the springs, and $\dot{\theta}_2$ is a speed of the mirror.

16. The method according to claim 15, wherein the first and second driving moments are applied to torsional springs of the mirror and the first driving moment is given by the equation:

$$k\dot{\theta}_1 t = M_1$$

wherein k is a stiffness constant of the springs, $\dot{\theta}_1$ is a first derivative of an angular position of the mirror, and t is time.

17. The method according to claim 15, wherein the first and second driving moments are applied to torsional springs of the mirror and the extra driving moment (M-$M_1$) is equal to:

$$M - M_1 = \ddot{\theta}_0 \left[ k \frac{t^2}{2} + j \right] + k\theta_x$$

wherein k is a stiffness constant of the springs, $\ddot{\theta}_0$ is a second derivative of an angular position of the mirror at a zooming instant, j is an inertial angular mass of the mirror, t is time, and $\theta_x$ is the angular position of the mirror at the zooming instant.

18. The method according to claim 15, wherein applying the first driving moment comprises rotating the MEMS mirror at a first constant speed $\dot{\theta}_1$ and applying the third driving moment comprises rotating the MEMS mirror at the speed $\dot{\theta}_2$, which is constant.

19. The method according to claim 15, comprising:
reading from a conversion table a control electrical quantity corresponding to an instant driving moment; and
controlling rotation of the MEMS mirror according to the control electrical quantity read from the conversion table.

* * * * *